United States Patent
Shimada

(10) Patent No.: US 9,438,920 B2
(45) Date of Patent: Sep. 6, 2016

(54) PICTURE ENCODING METHOD, PICTURE ENCODING APPARATUS, PICTURE DECODING METHOD AND PICTURE DECODING APPARATUS

(71) Applicant: FUJITSU LIMITED, Kawasaki-shi, Kanagawa (JP)

(72) Inventor: Miwa Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/886,271

(22) Filed: Oct. 19, 2015

(65) Prior Publication Data

US 2016/0142721 A1 May 19, 2016

(30) Foreign Application Priority Data

Nov. 13, 2014 (JP) .................... 2014-230967

(51) Int. Cl.
| | |
|---|---|
| *G06K 9/00* | (2006.01) |
| *H04N 19/186* | (2014.01) |
| *H04N 19/172* | (2014.01) |
| *H04N 19/117* | (2014.01) |

(52) U.S. Cl.
CPC .......... *H04N 19/186* (2014.11); *H04N 19/117* (2014.11); *H04N 19/172* (2014.11)

(58) Field of Classification Search
CPC ............. H04N 19/186; H04N 19/117; H04N 19/172; H04N 19/59; H04N 19/48; H04N 19/51; H04N 19/60; H04N 19/61; H04N 19/80; G06T 3/4007; G06T 3/4084
USPC ....................................... 382/166
See application file for complete search history.

(56) References Cited

U.S. PATENT DOCUMENTS

| | | | |
|---|---|---|---|
| 6,618,443 B1 | 9/2003 | Kim et al. | |
| 2009/0231487 A1 | 9/2009 | Nakagawa et al. | |
| 2010/0091183 A1* | 4/2010 | Hatasawa ................ | H04N 9/64 348/448 |
| 2010/0208989 A1* | 8/2010 | Narroschke ............ | H04N 1/646 382/166 |
| 2010/0209016 A1 | 8/2010 | Kimata et al. | |
| 2015/0189276 A1* | 7/2015 | Sugimoto .............. | H04N 19/61 375/240.02 |

FOREIGN PATENT DOCUMENTS

| | | |
|---|---|---|
| JP | 2000-156858 | 6/2000 |
| JP | 2009-246929 | 10/2009 |
| JP | 2011-118908 | 6/2011 |

\* cited by examiner

*Primary Examiner* — Yon Couso
(74) *Attorney, Agent, or Firm* — Fujitsu Patent Center

(57) ABSTRACT

A picture encoding method includes: generating encoded data of a luminance component of a picture and encoded data of a first color difference component which has a first resolution; generating interpolated data by applying one of a plurality of upsampling filters to data obtained by decoding the encoded data of the first color difference component; calculating difference data by obtaining differences in corresponding pixels between the interpolated data and a second color difference component of the picture which has a second resolution higher than the first resolution; generating encoded data of the difference data; and generating a stream that contains filter information indicating the applied upsampling filter, the encoded data of the luminance component, the encoded data of the first color difference component, and the encoded data of the difference data.

15 Claims, 9 Drawing Sheets

PICTURE ENCODING METHOD, PICTURE ENCODING APPARATUS, PICTURE DECODING METHOD AND PICTURE DECODING APPARATUS

CROSS-REFERENCE TO RELATED APPLICATION

This application is based upon and claims the benefit of priority of the prior Japanese Patent Application No. 2014-230967, filed on Nov. 13, 2014, the entire contents of which are incorporated herein by reference.

FIELD

The embodiments discussed herein are related to a picture encoding method, a picture encoding apparatus, a picture decoding method, and a picture decoding apparatus.

BACKGROUND

When each picture contained in video data has color components, a color space called YUV, for example, is used to represent the luminance and chromaticity of each pixel of the picture. In YUV, each pixel in a picture is represented by the values of the luminance component Y and two color difference components U and V. YUV image formats include a format known as YUV 444 in which no pixels are decimated to represent the color difference components, and other formats such as YUV 420 and YUV 422 in which pixels are decimated to represent the color difference components.

Video data represented in YUV 420 format is irreversible (lossy) video data whose chrominance information is degraded from that of the original video data. On the other hand, video data represented in YUV 444 format is lossless video data whose chrominance information is not degraded from that of the original video data. However, in the case of video data represented in YUV 444 format, the amount of data used to represent the color difference components U and V is four times as large as the amount of data that would be used to represent the color difference components U and V if the same video data were to be represented in YUV 420 format.

It is therefore preferable to use video data represented in YUV 444 format if the video data is to be encoded so as to minimize the difference between the chrominance information of the original video data and the chrominance information of the video data obtained by decoding the once encoded video data. However, a decoding computer program or decoding apparatus used to decode the encoded video data may be compatible with YUV 420 format but may not be compatible with YUV 444 format. In view of this, it is preferable to encode video data so that the video data can be reproduced in both YUV 444 and YUV 420 formats. On the other hand, in the prior art, there is proposed a technique that generates an image having a higher resolution than an image obtained in advance (for example, refer to Japanese Laid-open Patent Publication No. 2011-118908).

SUMMARY

However, when pictures of video data of two different formats having different resolutions are both encoded, the amount of encoded data increases.

According to one embodiment, a recording medium having recorded thereon a picture encoding program is provided. The picture encoding program recorded on the recording medium includes instructions for causing a computer to execute a process includes: encoding a luminance component of a picture and a first color difference component of the picture which has a first resolution to generate encoded data of the luminance component and encoded data of the first color difference component; generating interpolated data by applying one of a plurality of upsampling filters to data obtained by decoding the encoded data of the first color difference component; calculating difference data by obtaining differences in corresponding pixels between the interpolated data and a second color difference component of the picture which has a second resolution higher than the first resolution; generating encoded data of the difference data by encoding the difference data; and generating a stream that contains filter information indicating the applied upsampling filter, the encoded data of the luminance component, the encoded data of the first color difference component, and the encoded data of the difference data.

According to another embodiment, a recording medium having recorded thereon a picture decoding program is provided. The picture decoding program recorded on the recording medium includes instructions for causing a computer to execute a process includes: decoding a luminance component of a picture, a first color difference component of the picture which has a first resolution, and difference data for the picture from a stream that contains encoded data of the luminance component, encoded data of the first color difference component, filter information indicating an upsampling filter applied to the first color difference component among a plurality of upsampling filters, and encoded data of the difference data which has a second resolution higher than the first resolution; generating interpolated data having the second resolution by applying the upsampling filter indicated by the filter information to the decoded first color difference component; and obtaining a sum of corresponding pixels between the interpolated data and the difference data to decode a second color difference component of the picture which has the second resolution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A picture encoding apparatus and a picture encoding method and picture encoding program to be used by the picture encoding apparatus will be described below with reference to the accompanying drawings. First, YUV 444 and YUV 420 formats will be described.

Figure 1:
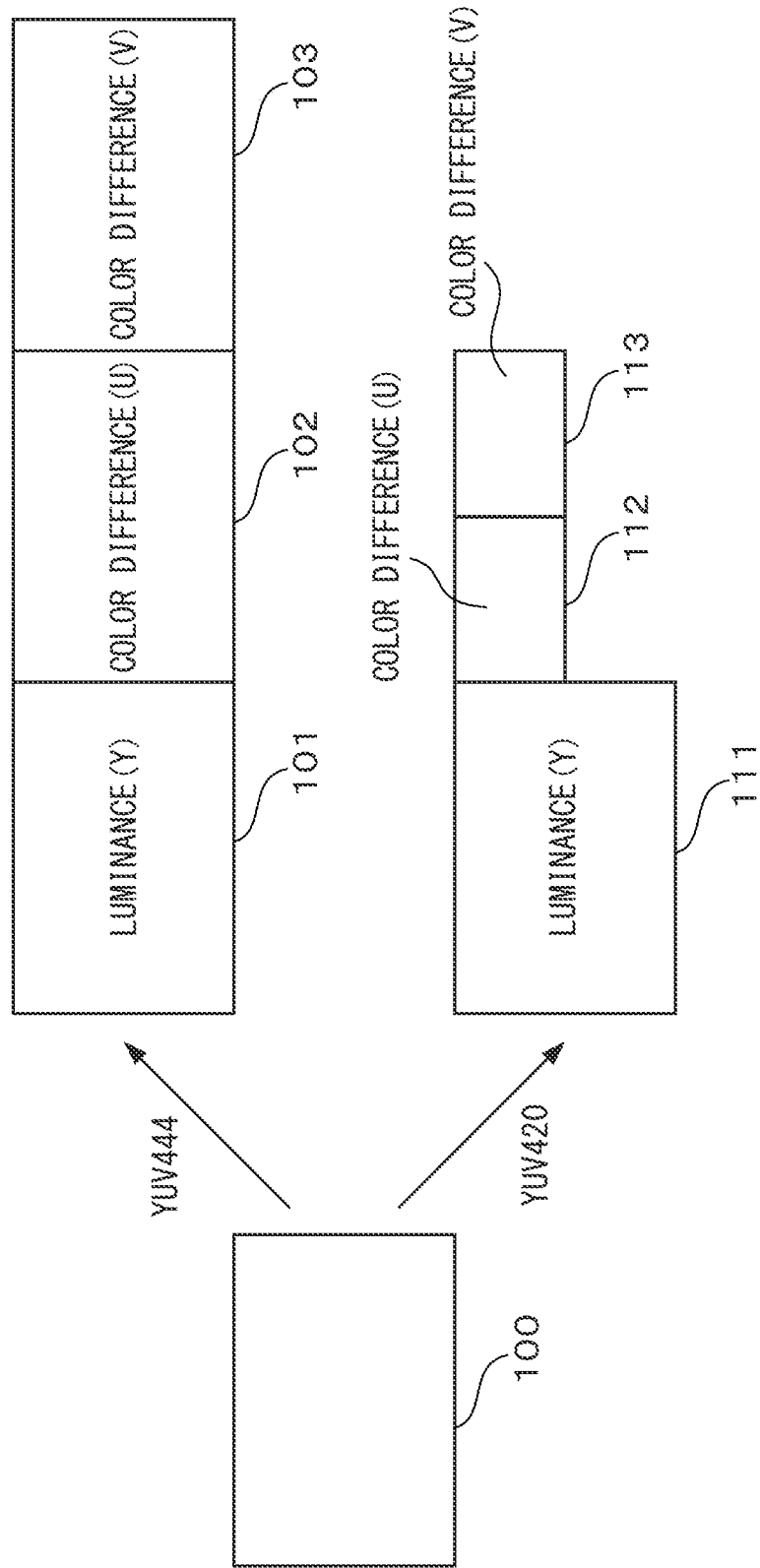
FIG. 1 is a diagram illustrating components in YUV 444 format and components in YUV 420 format.

FIG. 1 is a diagram illustrating components in YUV 444 format and components in YUV 420 format. In YUV 444 format, a picture 100 is represented by one luminance component 101 and two color difference components (U, V) 102 and 103, each having the same resolution as the picture 100. In other words, the luminance component 101 and the two color difference components (U, V) 102 and 103 are each represented as an image having the same number of pixels as the picture 100. In YUV 420 format also, the luminance component 111 is represented as an image having the same resolution as the picture 100. In other words, the luminance component 101 and the luminance component 111 can be the same. However, in the color difference components (U, V) 112 and 113 in YUV 420 format, pixels are decimated so as to reduce the number of pixels to one half of the number of pixels in the picture 100 in both the horizontal and vertical directions. In other words, the color difference components (U, V) 112 and 113 are each represented as an image with the number of pixels equal to one quarter of the number of pixels in the picture 100. The resolution of the color difference components (U, V) 112 and 113 is lower than the resolution of the color difference components (U, V) 102 and 103.

The picture encoding apparatus encodes each picture in video data so that the picture can be reproduced in both YUV 420 and YUV 444 formats. More specifically, for each picture contained in video data, the picture encoding apparatus encodes the luminance component and the two color difference components represented in YUV 420 format. After that, the picture encoding apparatus applies one of a plurality of upsampling filters to the data obtained by decoding the two color difference components and obtains, for each color difference component, interpolated data having the same resolution as the color difference component in YUV 444 format. Then, for each color difference component, the picture encoding apparatus obtains difference data between the interpolated data and the color difference component in YUV 444 format, and encodes the difference data. Then, for each picture, the picture encoding apparatus generates an output bit stream by including therein the encoded data of the difference data and filter information indicating the applied upsampling filter as well as the luminance component and the encoded data of the color difference components in YUV 420 format.

The picture may be either a frame or a field. A frame refers to one complete still image contained in video data, while a field refers to a still image obtained by extracting data only in the odd-numbered lines or even-numbered lines from one frame.

Figure 2:
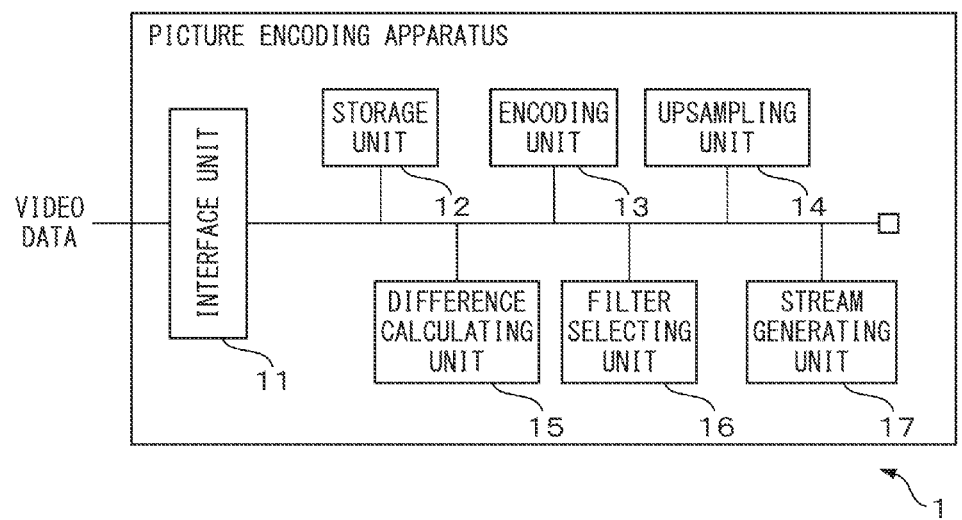
FIG. 2 is a diagram schematically illustrating the configuration of a picture encoding apparatus according to one embodiment.

FIG. 2 is a diagram schematically illustrating the configuration of a picture encoding apparatus according to one embodiment. The picture encoding apparatus 1 includes an interface unit 11, a storage unit 12, an encoding unit 13, an upsampling unit 14, a difference calculating unit 15, a filter selecting unit 16, and a stream generating unit 17. These units included in the picture encoding apparatus 1 are implemented, for example, as separate circuits, and interconnected by signal lines. Alternatively, these units included in the picture encoding apparatus 1 may be implemented in the form of a single integrated circuit and mounted in a video data generating apparatus such as a digital camera or video camera.

The interface unit 11 acquires video data to be encoded. For this purpose, the interface unit 11 includes, for example, an interface circuit for connecting the picture encoding apparatus 1 to another apparatus (not depicted). In the present embodiment, the interface unit 11 acquires video data in YUV 444 format and video data in YUV 420 format both of which represent the same video content. The video data acquired via the interface unit 11 is stored in the storage unit 12. Further, the interface unit 11 supplies an output bit stream containing the encoded video data to another apparatus.

The storage unit 12 includes, for example, a readable/writable volatile semiconductor memory circuit. The storage unit 12 stores the video data to be encoded. The storage unit 12 may also store a bit stream containing the encoded video data. Alternatively, the storage unit 12 may temporarily store data, etc. generated during the encoding of the video data.

The encoding unit 13 encodes the luminance component Y and the two color difference components U and V in YUV 420 format for each picture contained in the video data.

Further, for each picture, the encoding unit 13 encodes the difference data obtained from the difference calculating unit 15 for each of the two color difference components U and V that has the same resolution as the corresponding color difference component in YUV 444 format. The details of the color difference data will be described later.

The encoding unit 13 can employ as the coding method for encoding the luminance component, etc. any one of suitable coding methods such as MPEG-2 and MPEG-4 defined by the Moving Picture Experts Group (MPEG), H.264/MPEG-4 AVC, and H.265. Further, the encoding unit 13 can encode the luminance component, the two color difference components, and the two difference data by using the same coding method. Therefore, the following describes the process that the encoding unit 13 performs on the luminance component.

The encoding unit 13 divides the luminance component into a plurality of blocks, and generates a prediction error signal by calculating differences in corresponding pixels between each block and a predictive block for the block. More specifically, the encoding unit 13 generates the predictive block so as to minimize the coding cost which is an estimate of the amount of coding. For example, when the picture corresponding to the luminance component to be encoded is an I picture to which intra-predictive coding is applied, the encoding unit 13 generates the predictive block for each block from the values of the already encoded pixels around it so as to minimize the coding cost.

On the other hand, when the picture to be encoded is a P picture or B picture to which inter-predictive coding can be applied, the encoding unit 13 obtains a predictive block for each block, for example, by motion-compensating the luminance component of an already encoded picture. Further, the encoding unit 13 may obtain a predictive block by using the values of the already encoded pixels around the block. The encoding unit 13 selects from among these predictive blocks the predictive block that minimizes the coding cost, and uses the selected predictive block for the generation of the prediction error signal.

The encoding unit 13 obtains orthogonal transform coefficients by orthogonal-transforming the prediction error signal for each block, and quantizes the orthogonal transform coefficients. Then, the encoding unit 13 entropy-encodes the quantized orthogonal transform coefficients. The encoding unit 13 may also entropy-encode information used for the generation of the predictive block, such as a motion vector for motion compensation. In this way, the encoding unit 13 encodes the luminance component. The encoding unit 13 writes the encoded data of the luminance component into the storage unit 12.

Further, from the quantized orthogonal transform coefficients of each block, the encoding unit 13 reconstructs the values of the pixels of the block so that it can be referred to by a block remaining unencoded in the current luminance component or by the luminance component of a picture that is later in encoding order than the current luminance component. More specifically, the encoding unit 13 reconstructs the orthogonal transform coefficients of each block by inverse-quantizing the quantized orthogonal transform coefficients. Then, the encoding unit 13 reconstructs the prediction error signal of the block by inverse-orthogonal transforming the reconstructed orthogonal transform coefficients, and reconstructs the values of the pixels of the block by adding the prediction error signal to the value of each pixel in the corresponding predictive block. By reconstructing the values of the pixels for all the blocks in the encoded luminance component, the entire luminance component is reconstructed. The encoding unit 13 write the reconstructed luminance component into the storage unit 12.

The color difference components in YUV 420 format are also processed in like manner; i.e., the encoded data of the color difference components are obtained, and the color difference components are reconstructed from the encoded data. The reconstructed color difference components are used in the upsampling unit 14.

The encoding unit 13 notifies the filter selecting unit 16 of the amount of coding of the encoded data obtained by encoding the difference data for each color difference component.

For each picture in the video data, the upsampling unit 14 applies the plurality of upsampling filters to each of the reconstructed color difference components U and V in YUV 420 format. By applying each upsampling filter, the upsampling unit 14 obtains for each of the color difference components U and V the interpolated data that provides a picture having the same resolution as the color difference component in YUV 444 format.

A filter that obtains the value of each interpolated pixel by linearly interpolating between the values of its four or eight neighboring pixels, for example, is used as one of the plurality of upsampling filters. A filter that obtains the value of each interpolated pixel by directly taking the value of its vertically or horizontally adjacent pixel, for example, may be used as another one of the plurality of upsampling filters. Further, a filter disclosed in Japanese Laid-open Patent Publication No. 2014-45398 may be used as another one of the plurality of upsampling filters. According to this filter, the value of each interpolated pixel is obtained by adjusting the contribution of the pixel value of each addition candidate pixel in accordance with the similarity between a neighbor region containing the pixel to be interpolated and an addition candidate pixel neighbor region containing the addition candidate pixel and selected from a plurality of addition candidate regions neighboring the pixel to be interpolated.

The upsampling unit 14 supplies the interpolated data, obtained for each of the color difference components U and V by applying each upsampling filter, to the difference calculating unit 15.

For each picture in the video data, the difference calculating unit 15 calculates the difference data for the interpolated data of each color difference component by calculating differences in corresponding pixels between the interpolated data and the corresponding color difference component U or V in YUV format 444. Accordingly, the difference data represents pixel by pixel differences between the color difference component represented in YUV 444 format and the color difference component represented in YUV 420 format. The difference calculating unit 15 passes the difference data to the encoding unit 13.

In the present embodiment, the video data in YUV 444 format and the video data in YUV 420 format both represent the same video content. This means that the difference between the color difference component in YUV 444 format and the color difference component in YUV 420 format for the same picture is small. As a result, the value of each pixel in the difference data is often zero or close to zero, i.e., the value is relatively small. This means that, for the difference data, many of the quantized orthogonal transform coefficients obtained by the orthogonal transformation and quantization performed by the encoding unit 13 become zero in value. Therefore, the amount of coding can be reduced by encoding the difference data, rather than directly encoding the color difference components of the original picture.

The value of each pixel in the interpolated data differs depending on the upsampling filter used to generate the interpolated data. As a result, the value of each pixel in the difference data also differs depending on the upsampling filter used to generate the interpolated data. This means that the amount of coding of the difference data encoded by the encoding unit 13 differs, even for the same picture, depending on the difference data, i.e., depending on the upsampling filter used.

For each picture in the video data, the filter selecting unit 16 identifies for each of the color difference components U and V the difference data that minimizes the amount of coding of the data encoded by the encoding unit 13 from among the plurality of corresponding difference data. Then, the filter selecting unit 16 selects the upsampling filter used to generate the difference data that minimizes the amount of coding.

Figure 3:
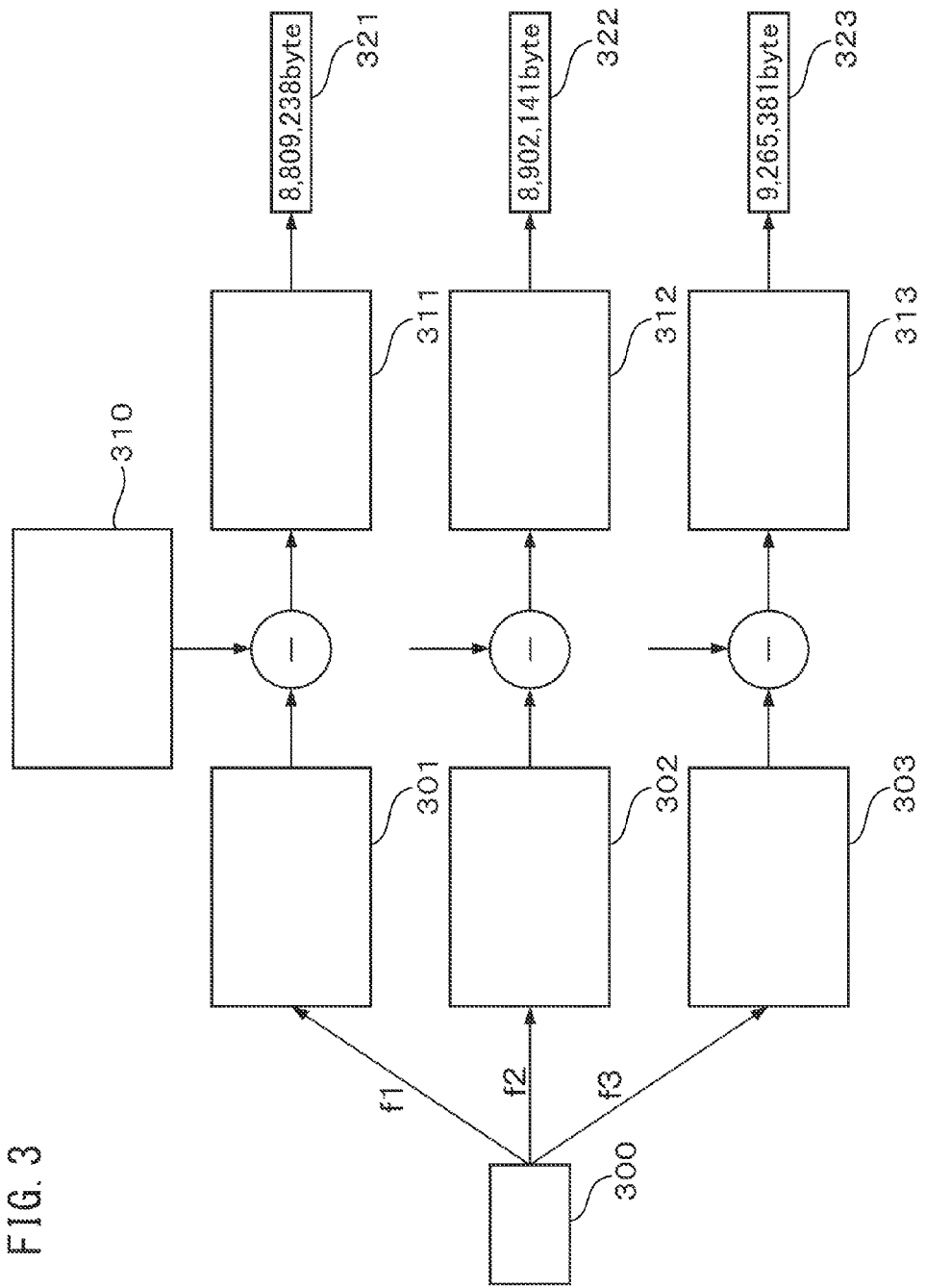
FIG. 3 is a diagram illustrating an overview of upsampling filter selection.

FIG. 3 is a diagram illustrating an overview of upsampling filter selection. By applying upsampling filters f1 to f3 to a color difference component 300 in YUV 420 format, a plurality of interpolated data 301 to 303, each having the same resolution as the corresponding color difference component in YUV 444 format, are obtained. Then, difference data 311 to 313 are obtained by calculating differences in corresponding pixels between the color difference component 310 in YUV 444 format corresponding to the color difference component 300 and the respective interpolated data 301 to 303. Then, by encoding the difference data 311 to 313, encoded data 321 to 323 are obtained.

For example, in the example illustrated in FIG. 3, the amount of coding of the encoded data 321 is the smallest among the encoded data 321 to 323. Therefore, the filter selecting unit 16 selects the upsampling filter f1 corresponding to the encoded data 321.

The filter selecting unit 16 sends filter information to the stream generating unit 17 to indicate the upsampling filter selected for each of the color difference components U and V. When the number of upsampling filters used in the upsampling unit 14 is n (n is an integer not smaller than 2), the filter information can take a numeric value, for example, in the range of 0 to n−1. Each numeric value indicates a different upsampling filter.

For each picture in the video data, the stream generating unit 17 reads out the encoded data of the luminance component Y and the encoded data of the color difference components U and V in YUV 420 format from the storage unit 12, and includes the readout data into the output bit stream. Further, for each picture, the stream generating unit 17 also includes in the output bit stream the filter information for each of the color difference components U and V and the encoded data of the difference data corresponding to the upsampling filter indicated by the filter information. The stream generating unit 17 may entropy-encodes the filter information before including it in the output bit stream. Further, the stream generating unit 17 generates header information in accordance with the coding method employed by the picture encoding apparatus 1, and appends the header information to the output bit stream.

Figure 4:
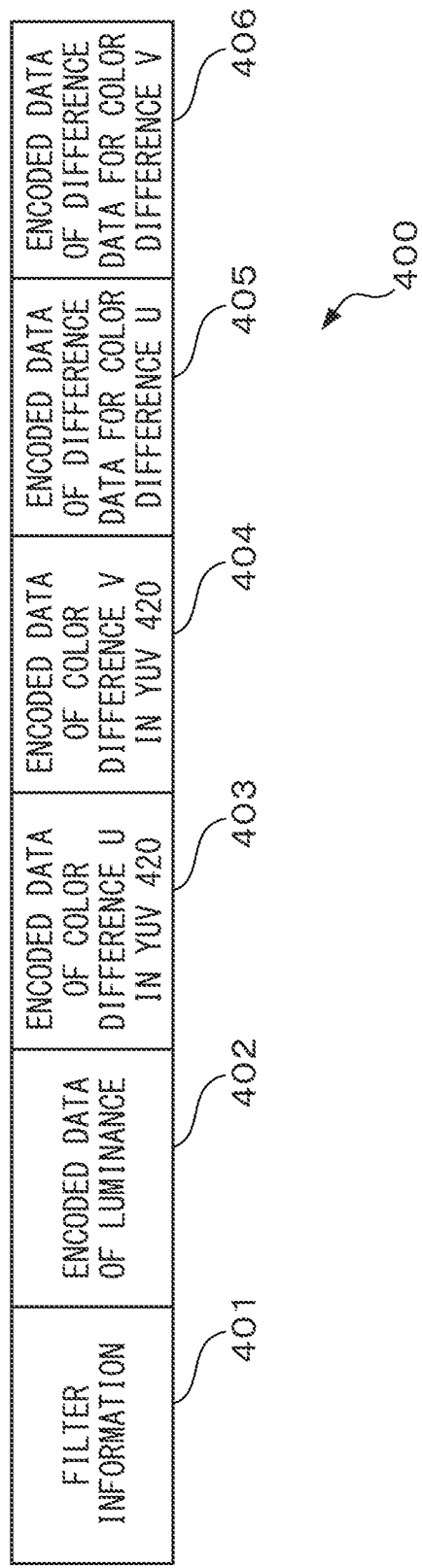
FIG. 4 is a diagram illustrating one example of an output bit stream.

FIG. 4 is a diagram illustrating one example of a bit stream generated for one picture. The bit stream 400 carries filter information 401 which is included in the header information. The bit stream 400 also carries the encoded data 402 of the luminance component, the encoded data 403 of the color difference component U in YUV 420 format, and the encoded data 404 of the color difference component V in YUV 420 format. The bit stream 400 further carries the encoded data 405 of the difference data for the color difference component U and the encoded data 406 of the difference data for the color difference component V. The order in which the respective encoded data are stored in the bit stream is not limited to the example illustrated in FIG. 4.

The stream generating unit 17 outputs the generated bit stream via the interface unit 11.

Figure 5:
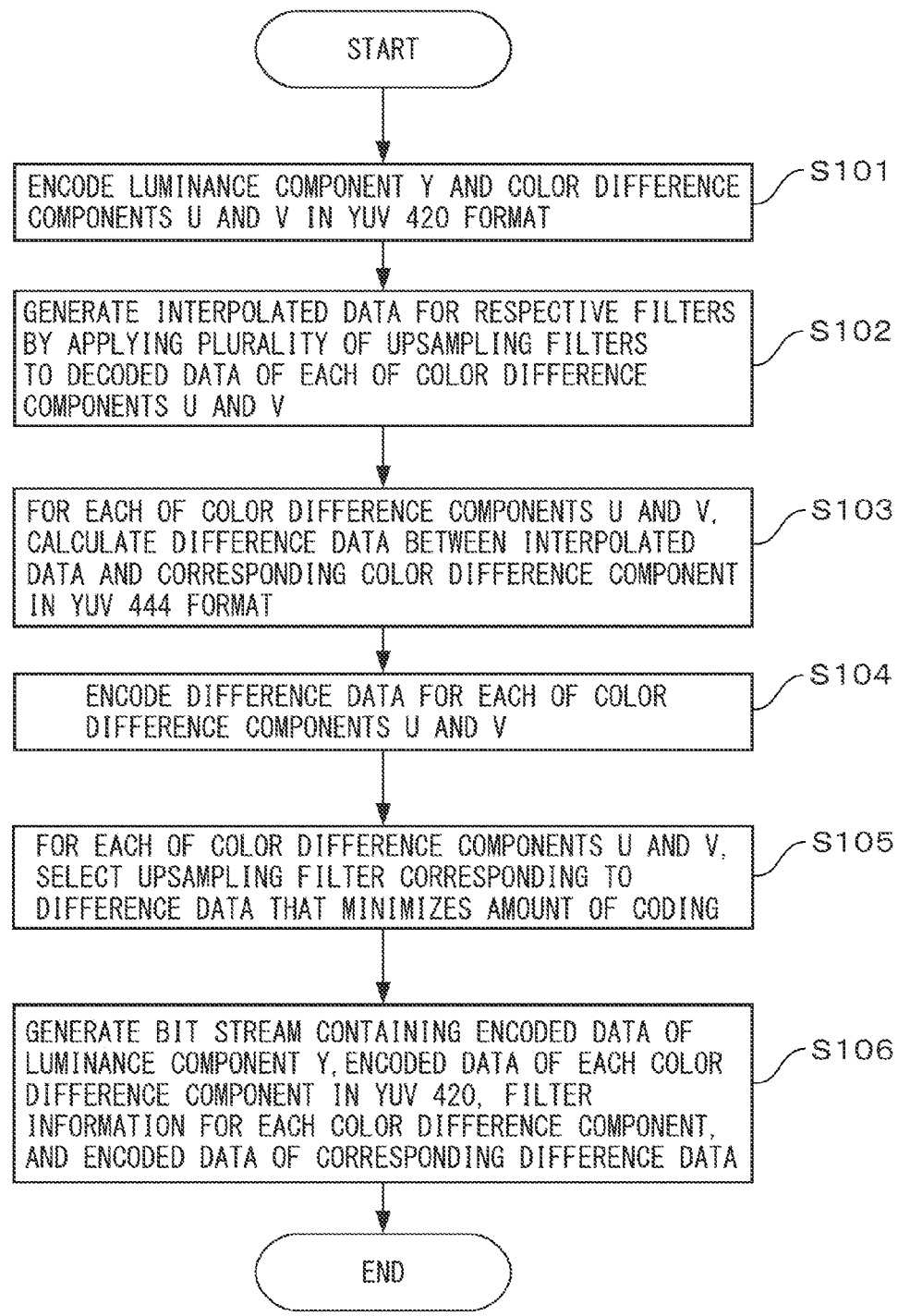
FIG. 5 is an operation flowchart of a picture encoding process.

FIG. 5 is an operation flowchart of a picture encoding process which is performed by the picture encoding apparatus 1. The picture encoding apparatus 1 performs the picture encoding process in accordance with the following flowchart for each picture contained in the video data.

The encoding unit 13 encodes the luminance component Y of the current picture in the video data and the two color difference components U and V in YUV 420 format (step S101). The encoding unit 13 writes the encoded data of the luminance component and the encoded data of the respective color difference components into the storage unit 12. The upsampling unit 14 obtains a plurality of interpolated data by applying each of a plurality of upsampling filters to data obtained by decoding the encoded data of each of the two color difference components U and V (step S102).

For each of the color difference components U and V, the difference calculating unit 15 calculates differences in corresponding pixels between each interpolated data and the corresponding color difference component in YUV 444 format to calculate difference data for each upsampling filter (step S103). Then, the difference calculating unit 15 passes the difference data to the encoding unit 13. The encoding unit 13 encodes the difference data (step S104). The encoding unit 13 writes the encoded data of the difference data into the storage unit 12.

For each of the color difference components U and V, the filter selecting unit 16 selects the upsampling filter corresponding to the difference data that minimizes the amount of coding among the plurality of difference data (step S105). Then, the filter selecting unit 16 sends the filter information indicating the selected upsampling filter to the stream generating unit 17.

The stream generating unit 17 generates a bit stream that contains the encoded data of the luminance component Y and the encoded data of the color difference components U and V in YUV 420 format. The stream generating unit 17 further includes in the bit stream the filter information for each of the color difference components U and V and the encoded data of the difference data corresponding to the upsampling filter indicated by the filter information (step S106). Then, the picture encoding apparatus 1 terminates the picture encoding process.

As has been described above, the picture encoding apparatus includes not only the encoded data of the luminance component and the encoded data of the color difference components in YUV 420 format but also the encoded data of the difference data of each color difference component into the output bit stream for each picture in the video data. As a result, the picture encoding apparatus can reduce the amount of coding compared with the case if encoded data that would be obtained by directly encoding each of the color difference components in YUV 444 format and YUV 420 format, respectively, were to be included in the output bit stream. Furthermore, the picture encoding apparatus generates a plurality of difference data by using a plurality of upsampling filters, and includes the encoded data of the difference data that minimizes the amount of coding among the plurality of difference data into the output bit stream together with the information indicating the corresponding upsampling filter. In this way, the picture encoding apparatus can further reduce the amount of coding.

According to a modified example, the stream generating unit 17 may include the filter coefficient of the applied upsampling filter as the filter information in the output bit stream. In this case, if an upsampling filter unknown to the picture decoding apparatus is used, the picture decoding apparatus can nevertheless decode the video data in YUV 444 format.

According to another modified example, the picture encoding apparatus 1 may generate video data in YUV 420 format by receiving video data in YUV 444 format and by downsampling the color difference components U and V of each picture contained in the received video data.

According to still another modified example, the filter selecting unit 16 may select the upsampling filter to be used, by referring to a table that provides a mapping between the degree of picture complexity and the upsampling filter that minimizes the amount of coding. In this case, from the degrees of complexity of the previously encoded pictures or a plurality of sample pictures, the number of times the amount of coding of difference data becomes minimum is obtained for each degree of complexity and for each upsampling filter. Then, based on the number of times, the table is constructed so that, for each degree of complexity, the upsampling filter with which the number of times the amount of coding of difference data becomes minimum is the largest will be selected as the upsampling filter for that degree of complexity. The table is prestored, for example, in the storage unit 12. This table may be updated based on the degree of complexity obtained for each encoded picture in the video data being encoded and on the amount of coding of difference data obtained for each upsampling filter.

The filter selecting unit 16 may determine the degree of complexity, for example, based on the standard deviation of the pixel values taken over the entire picture or over a portion of the picture or on the average value of edge intensities between neighboring pixels over the entire picture or over a portion of the picture. Alternatively, the filter selecting unit 16 may calculate the degree of complexity for each color difference component in YUV 444 format. In the latter case, the upsampling filter is selected for each color difference component.

Figure 6:
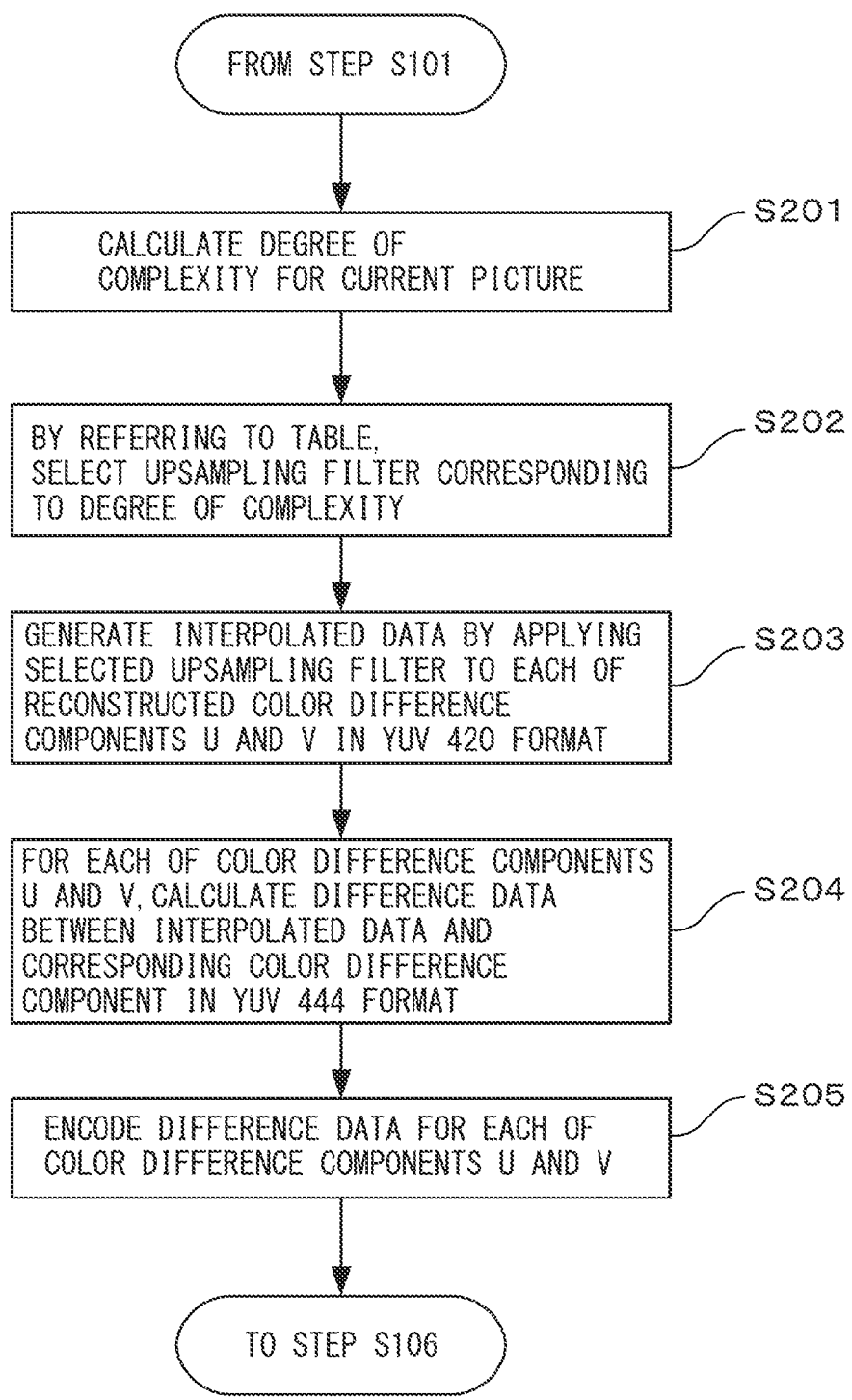
FIG. 6 is an operation flowchart of a picture encoding process according to a modified example.

FIG. 6 is an operation flowchart of a picture encoding process according to the above modified example. This operation flowchart differs from the operation flowchart of FIG. 5 in the processing of steps S102 to S105. Therefore, the processing that differs from the processing of steps S102 to S105 in FIG. 5 will be described with reference to FIG. 6.

After the processing of step S101, the filter selecting unit 16 calculates the degree of complexity for the current picture (step S201). Then, by referring to the table, the filter selecting unit 16 selects the upsampling filter corresponding to the degree of complexity (step S202). The filter selecting unit 16 sends information indicating the selected upsampling filter to both the upsampling unit 14 and the stream generating unit 17.

The upsampling unit 14 generates interpolated data by applying the selected upsampling filter to a respective one of the reconstructed color difference components U and V in YUV 420 format (step S203). For each of the color difference components U and V, the difference calculating unit 15 calculates difference data by calculating differences in corresponding pixels between the interpolated data and the corresponding color difference component in YUV 444 format (step S204). Then, the difference calculating unit 15 passes the difference data for each color difference component to the encoding unit 13. The encoding unit 13 encodes the difference data (step S205). The encoding unit 13 writes the encoded data of the difference data into the storage unit 12.

After the processing of step S205, the picture encoding apparatus 1 proceeds to carry out step S106 and then terminates the picture encoding process.

According to this modified example, the picture encoding apparatus can further reduce the amount of computation, because the apparatus need only generate one interpolated data and one difference data for each color difference component in each picture and need only encode the difference data.

According to a further modified example, the picture encoding apparatus 1 may select only one upsampling filter for each plurality of pictures, for example, for each Group of Pictures (GOP). In this case, the filter selecting unit 16 need only select, for example, an upsampling filter that minimizes the total amount of coding of difference data for the plurality of pictures. Then, the picture encoding apparatus 1 may include the filter information in the output bit stream only once every plurality of pictures. Accordingly, in the case of video data where the upsampling filter that minimizes the amount of coding of difference data is the same for a plurality of successive pictures, the picture encoding apparatus 1 can further improve coding efficiency.

According to a still further modified example, the encoding unit 13 may encode the difference data by using a different coding method than the coding method used to encode the luminance component and the color difference components in YUV 420 format. For example, the encoding unit 13 may use H.265 to encode the difference data and H.264 to encode the luminance component and the color difference components in YUV 420 format.

Next, a picture decoding apparatus will be described which decodes each picture in the video data encoded by the picture encoding apparatus according to the above embodiment or according to any one of the above modified examples.

Figure 7:
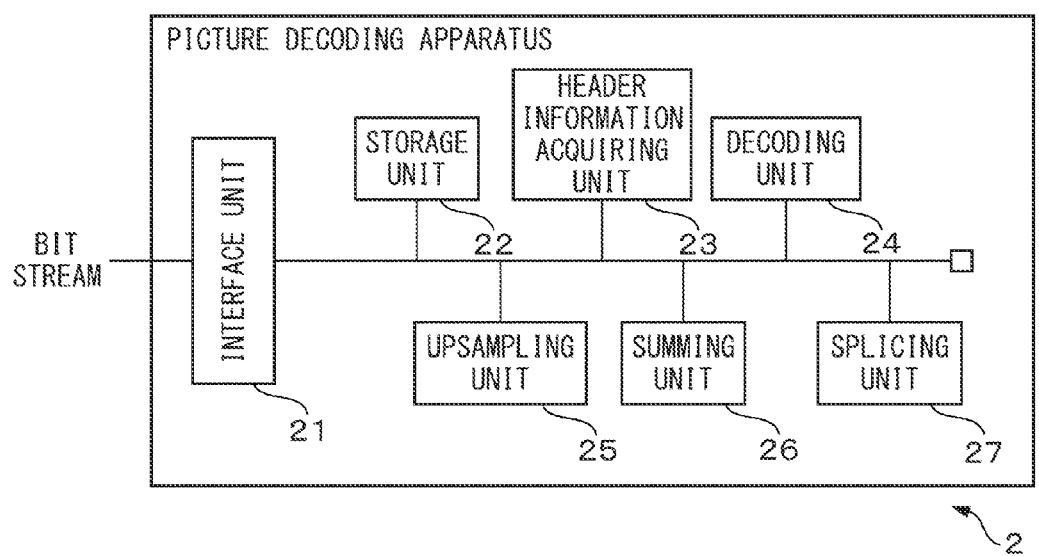
FIG. 7 is a diagram schematically illustrating the configuration of a picture decoding apparatus according to one embodiment.

FIG. 7 is a diagram schematically illustrating the configuration of a picture decoding apparatus according to one embodiment. The picture decoding apparatus 2 includes an interface unit 21, a storage unit 22, a header information acquiring unit 23, a decoding unit 24, an upsampling unit 25, a summing unit 26, and a splicing unit 27. These units included in the picture decoding apparatus 2 are implemented, for example, as separate circuits, and interconnected by signal lines. Alternatively, these units included in the picture decoding apparatus 2 may be implemented in the form of a single integrated circuit and mounted in a video data reproducing apparatus such as a display.

The interface unit 21 acquires a bit stream containing encoded video data to be decoded. The bit stream acquired via the interface unit 21 is stored in the storage unit 22. Further, the interface unit 21 may supply the decoded video data to another apparatus (not depicted).

The storage unit 22 includes, for example, a readable/writable volatile semiconductor memory circuit. The storage unit 22 stores the bit stream to be decoded. The storage unit 22 may also store the decoded video data. Alternatively, the storage unit 22 may temporarily store data, etc. generated during the decoding of the video data.

The header information acquiring unit 23 extracts header information for each picture from the bit stream containing the encoded video data. Then, from the header information for each picture, the header information acquiring unit 23 extracts filter information for each of the color difference components U and V. The header information acquiring unit 23 passes the filter information to the upsampling unit 25.

Further, the header information acquiring unit 23 extracts, from the bit stream containing the encoded video data, the encoded data of the luminance component and the encoded data of the two color difference components in YUV 420 format for each picture contained in the video data, and passes the encoded data to the decoding unit 24. From the bit stream containing the encoded video data, the header information acquiring unit 23 further extracts the encoded data of the difference data of each of the two color difference components for each picture, and passes the encoded data to the decoding unit 24.

For each picture contained in the video data, the decoding unit 24 decodes the luminance component and the two color difference components in YUV 420 format from the encoded data of the luminance component and the encoded data of the two color difference components in YUV 420 format, respectively. Further, for each picture contained in the video data, the decoding unit 24 decodes the difference data from the encoded data of the difference data for the two color difference components U and V, respectively. The decoding unit 24 decodes the luminance component, color difference components, and difference data in accordance with the picture coding method employed by the encoding unit 13 in the picture encoding apparatus 1. The decoding unit 24 writes the decoded luminance component, color difference components, and difference data for each picture into the storage unit 22.

For each picture contained in the video data, the upsampling unit 25 refers to the filter information and identifies the upsampling filter to be applied for each of the two color difference components in YUV 420 format. By applying the identified upsampling filter to the corresponding color difference component, the upsampling unit 25 obtains interpolated data having the same resolution as the color difference component in YUV 444 format. The upsampling unit 25 passes the obtained interpolated data to the summing unit 26.

For each picture contained in the video data, the summing unit 26 performs a summation between the value of each pixel in the decoded difference data and the value of the corresponding pixel in the interpolated data for each of the two color difference components U and V, to reconstruct the corresponding color difference component in YUV 444 format. The summing unit 26 writes the reconstructed color difference component into the storage unit 22.

The splicing unit 27 reads out the luminance component and the two color difference components in YUV 420 format stored for each picture in the storage unit 22, and arranges and splices them together in picture playback order to reconstruct the video data in YUV 420 format. Further, the splicing unit 27 reads out the luminance component and the two color difference components in YUV 444 format stored for each picture in the storage unit 22, and arranges and splices them together in picture playback order to reconstruct the video data in YUV 444 format.

The splicing unit 27 supplies the video data reconstructed in YUV 420 format or the video data reconstructed in YUV 444 format to another apparatus via the interface unit 21.

Figure 8:
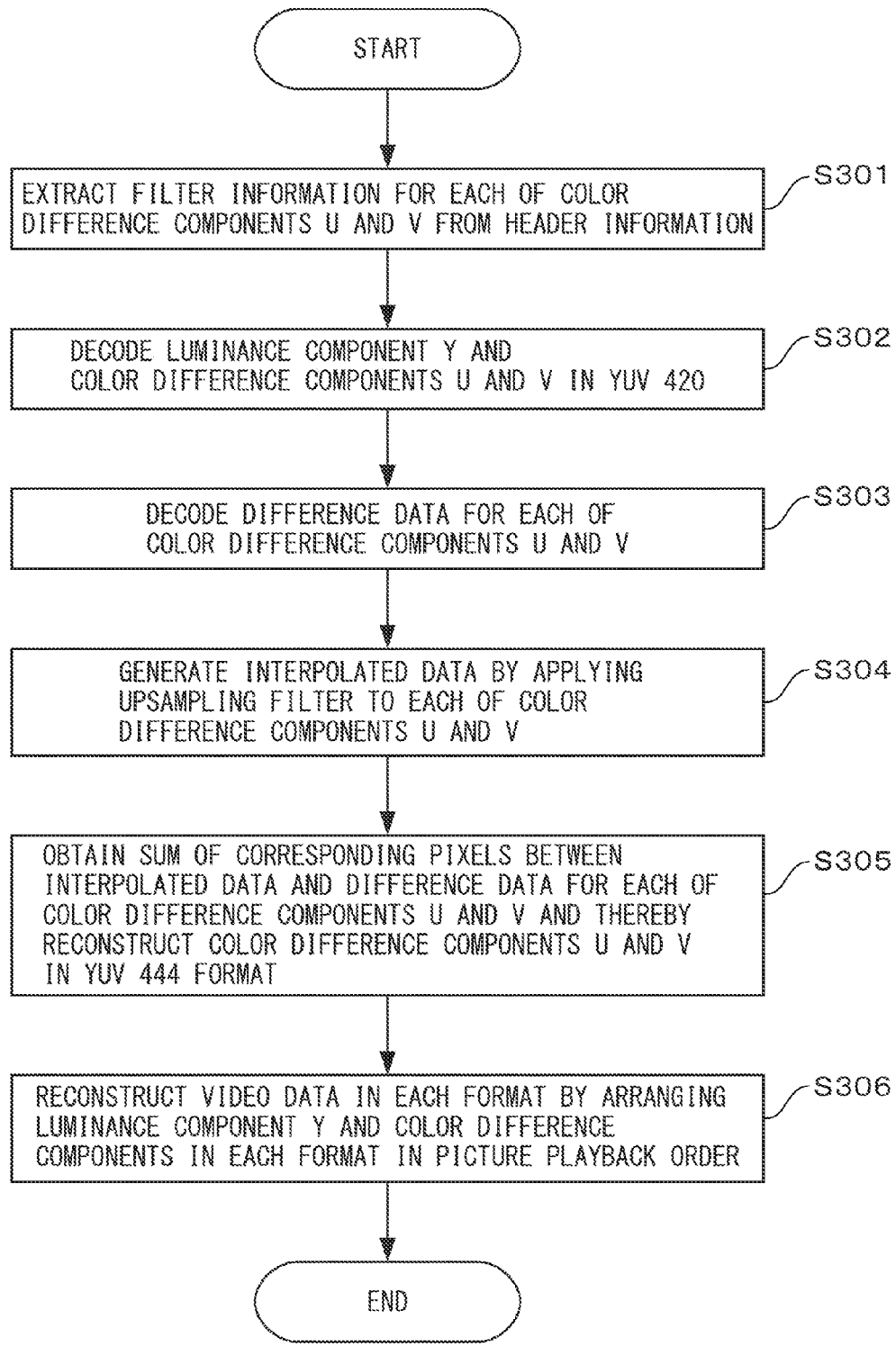
FIG. 8 is an operation flowchart of a picture decoding process.

FIG. 8 is an operation flowchart of a picture decoding process which is performed by the picture decoding apparatus 2. The picture decoding apparatus 2 performs the picture decoding process in accordance with the following flowchart for each picture contained in the video data.

The header information acquiring unit 23 extracts, from the header information carried in the bit stream containing the encoded video data, the filter information indicating the upsampling filter corresponding to the difference data for each of the color difference components U and V (step S301). The header information acquiring unit 23 passes the filter information to the upsampling unit 25.

The decoding unit 24 decodes the luminance component and the two color difference components U and V in YUV 420 format from the encoded data of the luminance component and the encoded data of the two color difference components U and V in YUV 420, respectively, for the current picture (step S302). Further, the decoding unit 24 decodes the difference data from the encoded data of the difference data for each of the two color difference components U and V (step S303). The decoding unit 24 writes the decoded luminance component, color difference components, and difference data into the storage unit 22.

The upsampling unit 25 obtains interpolated data by applying the upsampling filter indicated by the filter information to the decoded color difference component for each of the two color difference components U and V of the current picture (step S304). The upsampling unit 25 passes the obtained interpolated data to the summing unit 26.

The summing unit 26 obtains the sum of corresponding pixels between the decoded difference data and the interpolated data for each of the two color difference components U and V of the current picture, to reconstruct the color difference components U and V in YUV 444 format for that picture (step S305). The summing unit 26 writes the reconstructed color difference components into the storage unit 22.

The splicing unit 27 reads out the luminance component and the two color difference components in each format stored for the current picture in the storage unit 22, and arranges them in picture playback order to reconstruct the video data in each format (step S306). Then, the picture decoding apparatus 2 terminates the picture decoding process.

As has been described above, the picture decoding apparatus can reconstruct the video data in both YUV 444 and YUV 420 formats from the video data encoded by the picture encoding apparatus according to the above embodiment or according to any one of the above modified examples.

In the picture encoding apparatus and picture decoding apparatus according to the above embodiment or according to any one of the above modified examples, YUV 422 may be employed instead of YUV 420 as the format of the picture to be encoded or decoded. Alternatively, YUV 422 may be employed instead of YUV 444 as the format of the picture to be encoded or decoded. Further, YPbPr may be employed instead of YUV as the color space used to describe the picture to be encoded or decoded.

Further, the picture to be encoded or decoded may be a single independent picture. In this case, the encoding unit in the picture decoding apparatus and the decoding unit in the picture decoding apparatus may perform processing conforming to a still image coding method. Further, in this case, the picture encoding apparatus may include, separately from the encoding unit, a decoding unit which decodes the once encoded color difference components in YUV 420 format.

A computer program to be executed on a computer to implement the functions of the various units included in the picture encoding apparatus or picture decoding apparatus according to any one of the above embodiments or their modified examples may be provided in the form stored in a semiconductor memory or in the form recorded on a recording medium such as an optical recording medium. The term "recording medium" used here does not include a carrier wave.

Figure 9:
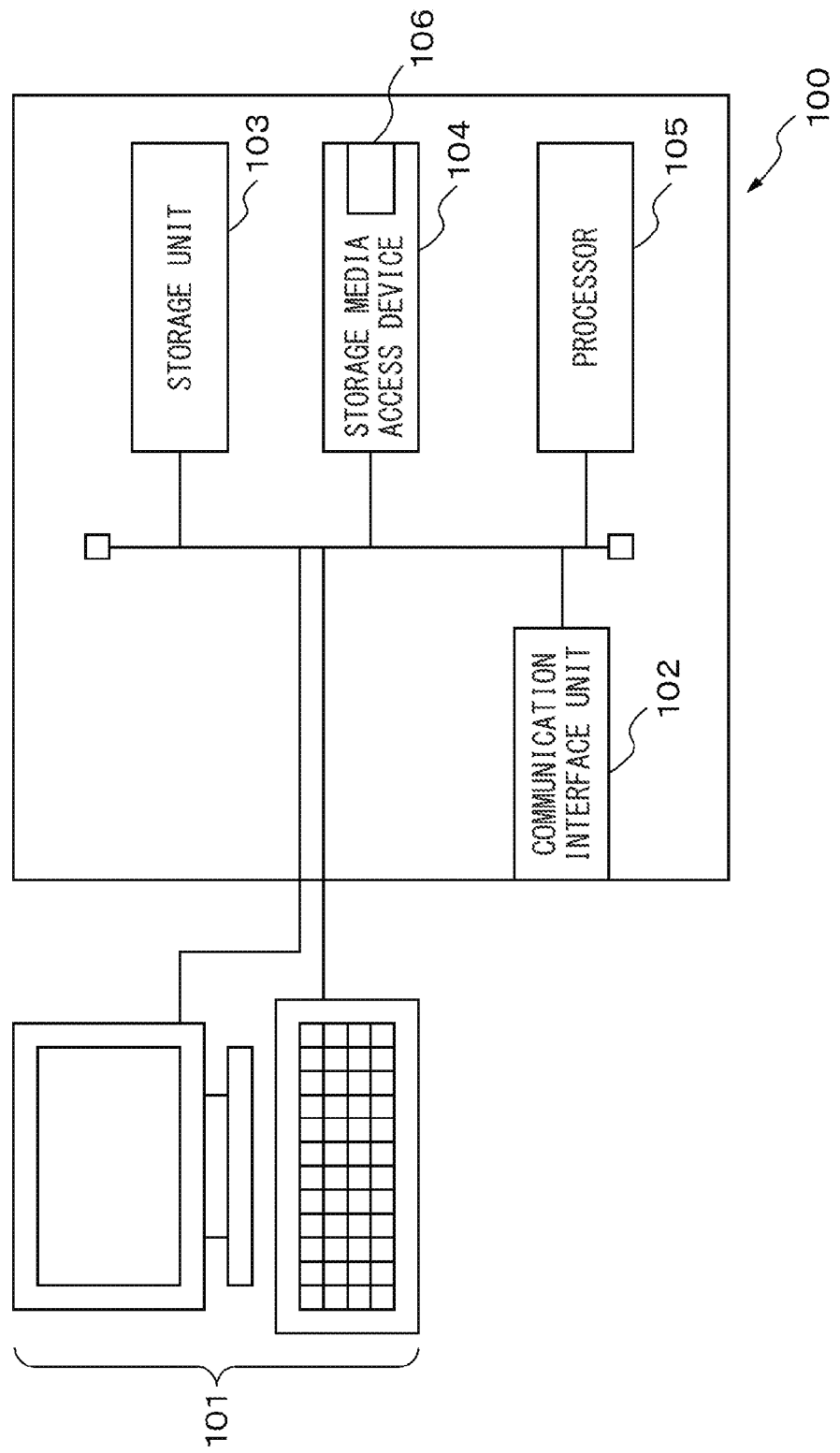
FIG. 9 is a diagram illustrating the configuration of a computer that operates as a picture encoding apparatus or picture decoding apparatus by executing a computer program for implementing the functions of the various units included in the picture encoding apparatus or picture decoding apparatus according to any one of the above embodiments or their modified examples.

FIG. 9 is a diagram illustrating the configuration of a computer that operates as a picture encoding apparatus or picture decoding apparatus by executing a computer program for implementing the functions of the various units included in the picture encoding apparatus or picture decoding apparatus according to any one of the above embodiments or their modified examples.

The computer 100 includes a user interface unit 101, a communication interface unit 102, a storage unit 103, a storage media access device 104, and a processor 105. The processor 105 is connected to the user interface unit 101, communication interface unit 102, storage unit 103, and storage media access device 104, for example, via a bus.

The user interface unit 101 includes, for example, an input device such as a keyboard and mouse and a display device such as a liquid crystal display. Alternatively, the user interface unit 101 may include a device, such as a touch panel display, into which an input device and a display device are integrated. The user interface unit 101 generates, for example, in response to a user operation, an operation signal for selecting the picture to be encoded or decoded, and supplies the operation signal to the processor 105. Further, the user interface unit 101 generates, for example, in response to a user operation, an operation signal for instructing which picture, a picture in YUV 444 format or a picture in YUV 420 format, is to be decoded, and supplies the operation signal to the processor 105.

The communication interface unit 102 may include a communication interface for connecting to a communication network conforming to a communication standard such as the Ethernet (registered trademark), and a control circuit for the communication interface. In this case, the communication interface unit 102 acquires the picture to be encoded or a bit stream containing the encoded picture from another apparatus connected to the communication network.

The storage unit 103 includes, for example, a readable/writable semiconductor memory and a read-only semiconductor memory. The storage unit 103 stores a computer program for implementing the picture encoding process or picture decoding process to be executed on the processor 105, and also stores data generated as a result of or during the execution of the program. The storage unit 103 functions, for example, as the storage unit 12 in the picture encoding apparatus or the storage unit 22 in the picture decoding apparatus.

The storage media access device 104 is a device that accesses a storage medium 106 such as a magnetic disk, a semiconductor memory card, or an optical storage medium. The storage media access device 104 accesses the storage medium 106 to read out, for example, the picture encoding program or picture decoding program to be executed on the processor 105, and passes the readout program to the processor 105.

By executing the picture encoding program according to any one of the above embodiments or their modified examples, the processor 105 encodes the picture so that the picture can be reconstructed not only in YUV 444 format but also in YUV 420 format. Alternatively, by executing the picture decoding program according to any one of the above embodiments or their modified examples, the processor 105 decodes from the bit stream containing the encoded data either the picture in YUV 444 format or the picture in YUV 420 format or both. Then, the processor 105 stores the reconstructed picture in the storage unit 103, or outputs it to the display device incorporated in the user interface unit 101.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having recorded thereon a picture encoding program that causes a computer to execute a process comprising:

encoding a luminance component of a picture and a first color difference component of the picture which has a first resolution to generate encoded data of the luminance component and encoded data of the first color difference component;

generating interpolated data by applying one of a plurality of upsampling filters to data obtained by decoding the encoded data of the first color difference component;

calculating difference data by obtaining differences in corresponding pixels between the interpolated data and a second color difference component of the picture which has a second resolution higher than the first resolution;

generating encoded data of the difference data by encoding the difference data; and generating a stream that contains filter information indicating the applied upsampling filter, the encoded data of the luminance component, the encoded data of the first color difference component, and the encoded data of the difference data.

2. The non-transitory computer-readable recording medium according to claim 1, wherein the generating the interpolated data includes applying each of the plurality of upsampling filters to the data obtained by decoding the encoded data of the first color difference component to generate the interpolated data for each of the plurality of upsampling filters, the generating the difference data includes calculating the difference data for each of the interpolated data corresponding to the plurality of upsampling filters, and the generating the encoded data of the difference data includes generating the encoded data of each of the difference data corresponding to the plurality of upsampling filters, and wherein the process further comprises selecting as the upsampling filter to be applied an upsampling filter that minimizes the amount of coding of the corresponding difference data among the plurality of upsampling filters.

3. The non-transitory computer-readable recording medium according to claim 1, wherein the process further comprises calculating the degree of complexity of the picture and, based on the degree of complexity, selecting the upsampling filter to be applied from among the plurality of upsampling filters.

4. The non-transitory computer-readable recording medium according to claim 3, wherein the selecting the upsampling filter to be applied includes, based on the degree of complexity, selecting the upsampling filter to be applied by referring to a table that provides a mapping between the degree of complexity and the upsampling filter to be selected from among the plurality of upsampling filters.

5. A picture encoding method comprising:

encoding, by a processor, a luminance component of a picture and a first color difference component of the picture which has a first resolution to generate encoded data of the luminance component and encoded data of the first color difference component;

generating, by the processor, interpolated data by applying one of a plurality of upsampling filters to data obtained by decoding the encoded data of the first color difference component;

calculating, by the processor, difference data by obtaining differences in corresponding pixels between the interpolated data and a second color difference component of the picture which has a second resolution higher than the first resolution;

generating, by the processor, encoded data of the difference data by encoding the difference data; and generating, by the processor, a stream that contains filter information indicating the applied upsampling filter, the encoded data of the luminance component, the encoded data of the first color difference component, and the encoded data of the difference data.

6. The picture encoding method according to claim 5, wherein the generating the interpolated data includes applying each of the plurality of upsampling filters to the data obtained by decoding the encoded data of the first color difference component to generate the interpolated data for each of the plurality of upsampling filters, the generating the difference data includes calculating the difference data for each of the interpolated data corresponding to the plurality of upsampling filters, and the generating the encoded data of the difference data includes generating the encoded data of each of the difference data corresponding to the plurality of upsampling filters, and wherein the picture encoding method further comprises selecting, by the processor, as the upsampling filter to be applied an upsampling filter that minimizes the amount of coding of the corresponding difference data among the plurality of upsampling filters.

7. The picture encoding method according to claim 5, further comprising calculating, by the processor, the degree of complexity of the picture and, based on the degree of complexity, selecting the upsampling filter to be applied from among the plurality of upsampling filters.

8. The picture encoding method according to claim 7, wherein the selecting the upsampling filter to be applied includes, based on the degree of complexity, selecting the upsampling filter to be applied by referring to a table that provides a mapping between the degree of complexity and the upsampling filter to be selected from among the plurality of upsampling filters.

9. A picture encoding apparatus comprising:
a processor configured to:
encode a luminance component of a picture, a first color difference component of the picture, and difference data for the picture to generate encoded data of the luminance component, encoded data of the first color difference component which has a first resolution, and encoded data of the difference data which has a second resolution higher than the first resolution;
generate interpolated data by applying one of a plurality of upsampling filters to data obtained by decoding the encoded data of the first color difference component;
calculate the difference data by obtaining differences in corresponding pixels between the interpolated data and a second color difference component of the picture which has the second resolution; and
generate a stream that contains filter information indicating the applied upsampling filter, the encoded data of the luminance component, the encoded data of the first color difference component, and the encoded data of the difference data.

10. The picture encoding apparatus according to claim 9, wherein the generating the interpolated data includes applying each of the plurality of upsampling filters to the data obtained by decoding the encoded data of the first color difference component to generate the interpolated data for each of the plurality of upsampling filters,
the generating the difference data includes calculating the difference data for each of the interpolated data corresponding to the plurality of upsampling filters, and
the generating the encoded data of the difference data includes generating the encoded data of each of the difference data corresponding to the plurality of upsampling filters, and wherein
the processor further configured to select as the upsampling filter to be applied an upsampling filter that minimizes the amount of coding of the corresponding difference data among the plurality of upsampling filters.

11. The picture encoding apparatus according to claim 9, wherein the processor further configured to calculate the degree of complexity of the picture and, based on the degree of complexity, select the upsampling filter to be applied from among the plurality of upsampling filters.

12. The picture encoding apparatus according to claim 11, wherein the selecting the upsampling filter to be applied includes, based on the degree of complexity, selecting the upsampling filter to be applied by referring to a table that provides a mapping between the degree of complexity and the upsampling filter to be selected from among the plurality of upsampling filters.

13. A non-transitory computer-readable recording medium having recorded thereon a picture decoding program that causes a computer to execute a process comprising:
decoding a luminance component of a picture, a first color difference component of the picture which has a first resolution, and difference data for the picture from a stream that contains encoded data of the luminance component, encoded data of the first color difference component, filter information indicating an upsampling filter applied to the first color difference component among a plurality of upsampling filters, and encoded data of the difference data which has a second resolution higher than the first resolution;
generating interpolated data having the second resolution by applying the upsampling filter indicated by the filter information to the decoded first color difference component; and
obtaining a sum of corresponding pixels between the interpolated data and the difference data to decode a second color difference component of the picture which has the second resolution.

14. A picture decoding method comprising:
decoding, by a processor, a luminance component of a picture, a first color difference component of the picture which has a first resolution, and difference data for the picture from a stream that contains encoded data of the luminance component, encoded data of the first color difference component, filter information indicating an upsampling filter applied to the first color difference component among a plurality of upsampling filters, and encoded data of the difference data which has a second resolution higher than the first resolution;
generating, by the processor, interpolated data having the second resolution by applying the upsampling filter indicated by the filter information to the decoded first color difference component; and
obtaining, by the processor, a sum of corresponding pixels between the interpolated data and the difference data to decode a second color difference component of the picture which has the second resolution.

15. A picture decoding apparatus comprising:
a processor configured to:
decode a luminance component of a picture, a first color difference component of the picture which has a first resolution, and difference data for the picture from a stream that contains encoded data of the luminance component, encoded data of the first color difference component, filter information indicating an upsampling filter applied to the first color difference component among a plurality of upsampling filters, and encoded data of the difference data which has a second resolution higher than the first resolution;
generate interpolated data having the second resolution by applying the upsampling filter indicated by the filter information to the decoded first color difference component; and
obtain a sum of corresponding pixels between the interpolated data and the difference data to decode a second color difference component of the picture which has the second resolution.

\* \* \* \* \*